United States Patent Office 3,195,683
Patented July 20, 1965

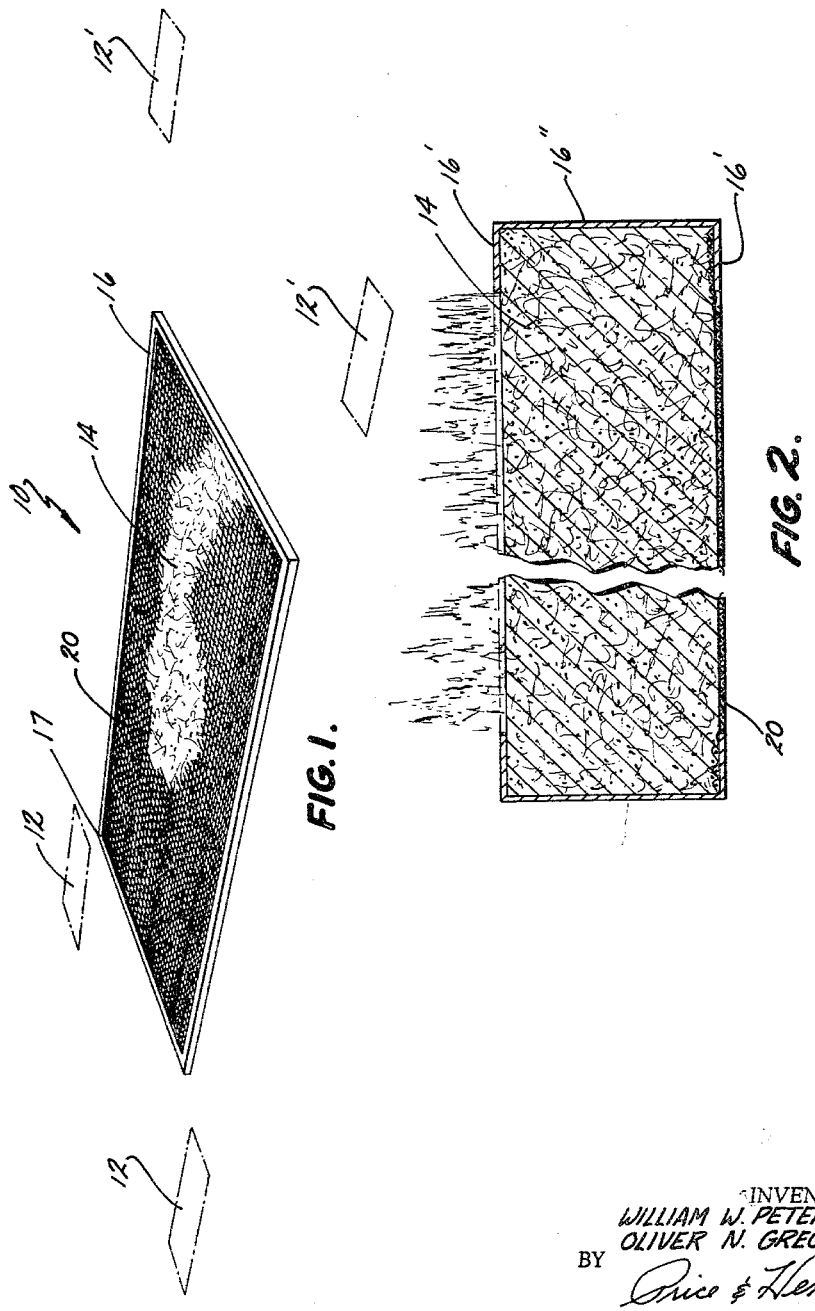

3,195,683
METHOD AND DEVICE OF OIL COLLECTION AND DISPOSAL
William W. Peterson and Oliver N. Gregg, Grand Rapids, Mich., assignors to Compositions Incorporated, Grand Rapids, Mich., a corporation of Michigan
Filed Feb. 13, 1963, Ser. No. 258,230
3 Claims. (Cl. 184—106)

This invention relates to a device for absorbing and collecting oil waste on garage floors and driveways from vehicles, or on machine shop floors, or in boats or the like, and relates more particularly to an oil absorbing, water-repellent, portable unit enabling collection of oil over a period of time, and disposal of the collected oil by combustion for reuse of the unit.

Any vehicle powered by an internal combustion engine inevitably sooner or later leaks oil, usually from the crankcase, but also often from the transmission and other parts. Such oil drips soak into concrete and asphalt surfaces on which the vehicles are parked to strain the surface, create a fire hazard.

Oil soaked floors are also prevalent in machine shops or around almost any oil lubricated equipment.

Another situation where waste oil creates a fire hazard as well as a nuisance is in the bilge of a boat or ship. The oil floats on the water and, if ignited, can cause a disaster. Removal of this oil has been practically impossible heretofore, however.

It is therefore an object of this invention to provide an oil absorbing device capable of neatly and efficiently collecting and retaining waste oil, and allowing its ready disposal.

It is another object of this invention to provide an oil absorbing device that is selectively water-repellent, enabling efficient disposal of the collected oil by combustion, thereby allowing the unit to be used again.

It is another object of this invention to provide a sturdy oil collecting unit that is completely portable, being light weight and handy to carry. The unit remains integral no matter what its position or location. It can be carried in any position desired without mess. It can be carried around with ease, laid down on the floor, slid under a vehicle, and after a period of time can be readily picked up with one hand and carried outside for burning.

It is another object of this invention to provide an oil absorbing water-repelling unit that is completely buoyant to float on water such as in the bilge of a boat and to absorb any oil floating on the water. Moreover, the water cannot penetrate the device to interfere with its selective absorption, or with subsequent removal by combustion, if desired.

It is another object of this invention to provide an oil absorbing, water-repelling unit to place beside machines to absorb oil that may be spilled or otherwise stray from the machines.

It is another object of this invention to provide a porous oil absorbing unit that will not support combustion, even when saturated with oil, until desired. Accidental or spontaneous combustion hazards thus present no problem.

Another object is to provide such a unit that is simple in construction, readily manufactured, inexpensive, has a long life, and is not unsightly.

These and other objects of this invention will be apparent upon studying the following specification in conjunction with the drawings in which:

FIGURE 1 is a perspective view of one form of the novel device shown in position with respect to the outline of a vehicle; and FIGURE 2 is a fragmentary, enlarged, sectional view of the device during combustion of the absorbed oil.

The inventive oil absorbing device 10 is shown in FIGURE 1 to be positioned in a space over which a vehicle is to be parked, such that the front wheels would be positioned in spaces 12 and the rear wheels in spaces 12'. The device would thus be beneath the crankcase, and preferably also the transmission.

The oil absorber 10 is shown to include a compressed, generally flat, rectangular board 14, a peripheral frame 16, and a wire mesh 20 of aluminum or the like over the top.

The board 14 is formed chiefly of expanded cellular refractory particles bonded with a petroleum base, water-impervious binder. The refractory particles are preferably perlite particles. Perlite is a volcanic rock from the Western United States in the form of a glassy, rhyolite, containing a small percentage of moisture. When crushed and carefully heated to a high temperature, the particles expand to a form a light weight cellular material ten to twenty times the original volume, as is well known. These expanded perlite particles are bounded together by an amount of suitable binder such as asphalt to integrate the particles into a unitary mass, and also render the board water-impervious. The particles are also preferably integrated by fibrous refractory material such as silica or alumina or equivalent fibers. Water drops contacting the material have a very high surface tension, and if resting on the board, approach a sphere in shape. The material is not "wetted" by the water, but rather repels it, mainly due to the binder. The refractory particles are of course incombustible.

The board readily absorbs oil since the oil is a petroleum base substance entirely compatible with and capable of "wetting" the petroleum base binder. It therefore is drawn into the tiny orifices and passageways of the board. The expanded, porous perlite material, often spoken of as perlite glass, has been found to work extremely well for this unit. When the perlite and asphalt binder have been pressed into a board, the board is an integral structure, self-supporting in nature. However, it is somewhat brittle and will crack if placed in shear. Also, it will not flex any significant amount without breakage. Therefore, the periphery of the board is enclosed with a peripheral frame 16. This frame has a generally U-shaped cross section as illustrated in FIGURE 2, with the two short legs 16' extending over the top and bottom portions of the board a small amount, and the main cross leg 16'' enclosing the peripheral edge. This frame provides structural rigidity to the unit to prevent breakage due to shear and to prevent flexing of the board that would crack it. It also prevents chipping along the edge. The frame may be formed of sheet metal wrapped around the board and joined at a corner 17 as by weldment, to connect the ends.

The frame also serves to retain the wire mesh or screen 20 over the exposed side of the device. It has been found that the oil soaked board will support combustion to burn off the contained oil if the bare face of the board is exposed to flame. Thus, the oil can be combusted for re-use of the board. However, with the metal mesh over its surface, the oil soaked board will not support combustion. In fact, it will not only fail to accidentally ignite, but even a purposely started flame will automatically extinguish after a few seconds interval. Consequently, by placing the unit with the screen on the exposed side to collect oil, all danger of fire is eliminated.

Instead of perlite, conceivably other refractory, cellular, expanded particles capable of being bonded into a water-impervious material may be used. Such a material might be a mica-type material, for example vermiculite. These expanded mica particles are bonded together with a water-repellent binder, preferably a petroleum base binder such as asphalt, rendering the material cohesive to form an integral unit, while also causing the unit to be water-impervious, but oil-pervious and absorbent.

The amount of binder used will depend upon its specific composition, its water-repellent characteristics, and its binding capacity. This is not ordinarily critical but must be at least in sufficient amount to cause the unit to be water-repellent and to bind the particles firmly together into an integral assembly, without impregnating the unit to an extent preventing absorption of oil. Using these guides, anyone having ordinary skill in the art can select the proper amount of a particular binder with a couple of trials. A typical amount of asphalt binder with perlite is about 5% by weight. The expanded cellular material, preferably perlite, is formed by crushing the ore, and then heating the particles to vaporize entrapped water and form cells in the heat softened glass. The resulting porous expanded cellular particles are mixed with the binder, preferably asphalt, and pressed into the form of a board. The board may be formed in large sheets, and cut to the sizes desired. Its dimensions can be varied both in width, length, and in thickness. Preferably, a thickness of one inch is employed. The screen is laid over the element and the reinforcing frame 16 is then wrapped around the board and over the screen, and is joined at its ends to secure it in place and integrate the structure.

The unit, then weighing a few pounds, may be placed on a surface over which a vehicle is to be parked. Oil drips from the automobile, when contacting the compressed material, are quickly absorbed. The element is left in place for an extended period of time to soak up oil and grease. Any water contacting the element runs and does not interfere with the subsequent firing process.

Instead of employing it with respect to vehicles, one or more elements may be placed beside a machine to collect any stray oil for neat disposal.

Also, one of the units may be dropped into the bilge of a boat. Since it is buoyant and since the oil is buoyant, it selectively absorbs the dangerous oil and repels water.

Conceivably, the element may be formed in several configurations other than the generally flat one. For example, it may take a spherical, hemispherical, cubical or other configuration, especially for bilge use or the like.

After the element has been used for an extended period of time, it may be picked up, taken outside, and fired by touching a match to it. The oil burns out of the porous material. Since the refractory structure is incombustible, it retains its form and shape for reuse.

As the screen or grid 20 is incorporated into the structure, it must be inverted (FIGURE 2) before combustion will be supported.

By way of example, experiments show the following data on the board. If a sample 1″ by 2″ by ¾″, originally weighing 22 grams, is soaked with oil to a total combined weight of 80.5 grams, and then fired, the resultant weight after firing will be around 34 grams. Thus, a major part of the oil is burned off. The unit is reuseable after this firing and can be soaked again with the oil. Eventually, the unit reaches a point of relative ineffectiveness and must be replaced by a new unit. During this period, however, its useful life is relatively long. Its price is low due to the relatively simple and inexpensive manufacturing steps required and the relatively inexpensive materials involved.

It can be readily seen that the novel structure and method fills a very definite need. Those in the field may readily devise certain obvious minor changes in materials and construction while incorporating the principles taught by this invention. These obvious modifications embodying the inventive principles, are therefore deemed to be part of this invention, which is to be limited only by the scope of the appended claims and the reasonable structures and methods to those defined therein, rather than by the illustrative examples recited and shown above.

We claim:

1. A method of neatly collecting and disposing of waste oil comprising the steps of: forming a mixture of cellular, expanded particulate refractory with a water-repellent binder; compressing the refractory and binder into a porous, oil-absorbent, water-repellent element; supporting said element in an area where oil is prevalent, to contact said oil for a period of time; and burning said waste oil out of said element, for reuse of said element.

2. An oil absorbing device allowing later combustion of the absorbed oil, comprising: a pre-formed, compressed, oil-pervious and absorbing, water-impervious, element formed of crushed, expanded, cellular perlite particles bonded together with a water-repellent petroleum base binder; a peripheral strengthening and retention frame around the peripheral edge of said board to integrate and rigidify the unit, to prevent edge chipping of said board and to strengthen said board against shear and flexure thereof.

3. An oil absorbing device, comprising: a compressed porous oil-absorbent, water-impervious element formed of refractory particles bonded together with a water-repellent binder; and a metal mesh on one side of said element extending over the exposed surface of said element, preventing accidental combustion of the absorbed oil, but allowing combustion of the oil from the opposite side of said element when it is inverted.

References Cited by the Examiner

UNITED STATES PATENTS 309,076  12/84  McCarroll _____ 20—4
2,626,864  1/53  Miscall.
3,062,323  11/62  Oganovic _____ 184—106

LAVERNE D. GEIGER, Primary Examiner.

MILTON KAUFMAN, Examiner.